(12) United States Patent
Chen

(10) Patent No.: US 6,714,406 B2
(45) Date of Patent: Mar. 30, 2004

(54) EXTRACTABLE MOTHERBOARD SEAT PLATE OF COMPUTER CASE

(75) Inventor: Deng-Hsi Chen, Keelung (TW)

(73) Assignee: Lian Li Industrial Co., Ltd., Keelung (TW)

(*) Notice: Subject to any disclaimer, the term of this patent is extended or adjusted under 35 U.S.C. 154(b) by 0 days.

(21) Appl. No.: 10/213,382

(22) Filed: Aug. 5, 2002

(65) Prior Publication Data

US 2004/0022018 A1 Feb. 5, 2004

(51) Int. Cl.$^7$ ................................................ G06F 1/16
(52) U.S. Cl. ................... 361/683; 361/725; 361/755; 361/796; 312/223.2
(58) Field of Search ............................... 361/683, 686, 361/724–727, 732, 740, 741, 756, 759, 786, 799, 801, 802; 211/41; 364/708.1; 312/223.2, 223.3; 439/928.1

(56) References Cited

U.S. PATENT DOCUMENTS

| | | | | |
|---|---|---|---|---|
| 4,977,532 A | * | 12/1990 | Borkowicz et al. ......... | 361/683 |
| 5,675,472 A | * | 10/1997 | Hamerton-Kelly .......... | 361/684 |
| 5,737,184 A | * | 4/1998 | Lai ............................. | 361/683 |
| 6,035,356 A | * | 3/2000 | Khan et al. .................. | 710/301 |
| 6,097,591 A | * | 8/2000 | Ircha .......................... | 361/683 |
| 6,137,678 A | * | 10/2000 | Gebara et al. ............... | 361/685 |
| 6,385,036 B1 | * | 5/2002 | Chien .......................... | 361/683 |

* cited by examiner

*Primary Examiner*—Michael Datskovsky
(74) *Attorney, Agent, or Firm*—Birch, Stewart, Kolasch & Birch, LLP

(57) ABSTRACT

An extractable motherboard seat plate of a computer case including a motherboard seat plate disposed on a lateral side of a frame for installing a computer motherboard is characterized that the back side of the frame is disposed with a long opening and a guide channel is respectively and oppositely disposed on the upper and the lower lateral sides of the long opening; at least one or more than one resilient press plate is disposed inwardly on one side of the guide channel; the motherboard seat plate slides into the guide channel; a big-end screw inserts a through hole on the back plate to fasten the motherboard seat plate onto the frame. The application according to the abovementioned structure is capable of fast installing or dismounting the motherboard seat plate to convenience the maintenance of the motherboard.

2 Claims, 4 Drawing Sheets

EXTRACTABLE MOTHERBOARD SEAT PLATE OF COMPUTER CASE

BACKGROUND OF THE INVENTION

1) Field of the Invention

The present invention relates to an extractable motherboard seat plate of a computer case, more particularly to a motherboard seat plate inserted on a long opening at the rear aspect of a frame for installing a computer motherboard; for maintaining the motherboard or inserting an interface card, to unscrew a big-end screw allows the extraction of the motherboard seat plate so as to eliminate the trouble of dismounting an outer case of the computer.

2) Description of the Prior Art

Accordingly, a body portion of a regular computer main unit mainly comprises a frame, an outer case and a front board; a motherboard seat plate is fixedly disposed inside the frame for installing a computer motherboard; a disk drive frame is disposed at the front aspect of the frame for installing a floppy disk drive, a hard disk drive and a CD-ROM drive; the front board is disposed at the front aspect of the frame and the outer case is disposed on the outer side of the frame.

Since the computer motherboard is installed on the motherboard seat plate inside the frame, the outer case of the frame has to be dismounted for inserting an interface card or maintaining the motherboard.

The conventional outer case is of an n-shaped case body and disposed on the frame via a plurality of screws penetrating through the bent lateral rim at the rear aspect of the outer case. Therefore, for inserting the interface card or maintaining the motherboard, it is necessary to use a screw driver to dismount the outer case and that is quite troublesome and inconvenient.

Furthermore, the disk drive frame for installing a 3.5-inch floppy disk drive or a hard disk drive is fixedly disposed at the front aspect of the frame; since one side of the disk drive frame is hidden inside the frame, one lateral side is not convenient for using screws to insert in a 3.5-inch floppy disk or a hard disk; therefore, the regular installation without using fastening screws causes an unstable assembly of a 3.5-inch floppy disk or a hard disk.

In view of the above mentioned shortcomings of assembling the frame of the conventional computer motherboard, the inventor of the present invention has designed an extractable motherboard seat plate of a computer motherboard to have a motherboard seat plate disposed on the lateral side of a frame for installing a computer motherboard and is characterized that the back side of the frame is disposed with a long opening and a guide channel is respectively and oppositely disposed on the upper and the lower lateral sides of the long opening; at least one or more than one resilient press plate is disposed inwardly on one side of the guide channel; through a guide rail disposed thereon, the motherboard seat plate enters the guide channel; the rear rim of the motherboard seat plate is vertically and fixedly disposed with a back plate for installing a connecting port and an interface card; after the motherboard seat plate inserts into the long opening on the back side of the frame, a big-end screw penetrates a through hole on the back plate to fasten the motherboard seat plate onto the frame. For maintaining the motherboard and inserting the interface card, the application according to the abovementioned structure allows a fast and manual unscrewing of the screws to extract the motherboard seat plate so as to eliminate the trouble of dismounting the outer case of the computer and achieve the efficiency of stabling the motherboard seat plate.

SUMMARY OF THE INVENTION

Therefore, the primary objective of the present invention is to provide a motherboard seat plate to be fast assembled via inserting through a long opening at the rear aspect of a frame to fasten a computer motherboard; for maintaining the motherboard and replacing an interface card, it is merely necessary to unscrew a big-end screw to simply and conveniently extract the motherboard seat plate thereby eliminating the trouble of dismounting an outer case of a computer.

Another objective of the present invention is to provide an extractable motherboard seat plate of a computer case, wherein the inner side of a guide channel provided for the sliding of the motherboard seat plate is disposed with one or more than one resilient press plate thereby stably clamping the motherboard seat plate therein so as to enhance the steadiness of a computer application.

To enable a further understanding of the structure and the efficiency of the present invention, the brief description of the drawings below is followed by the detailed description of the preferred embodiment.

DETAILED DESCRIPTION OF THE PREFERRED EMBODIMENTS

Figure 1:
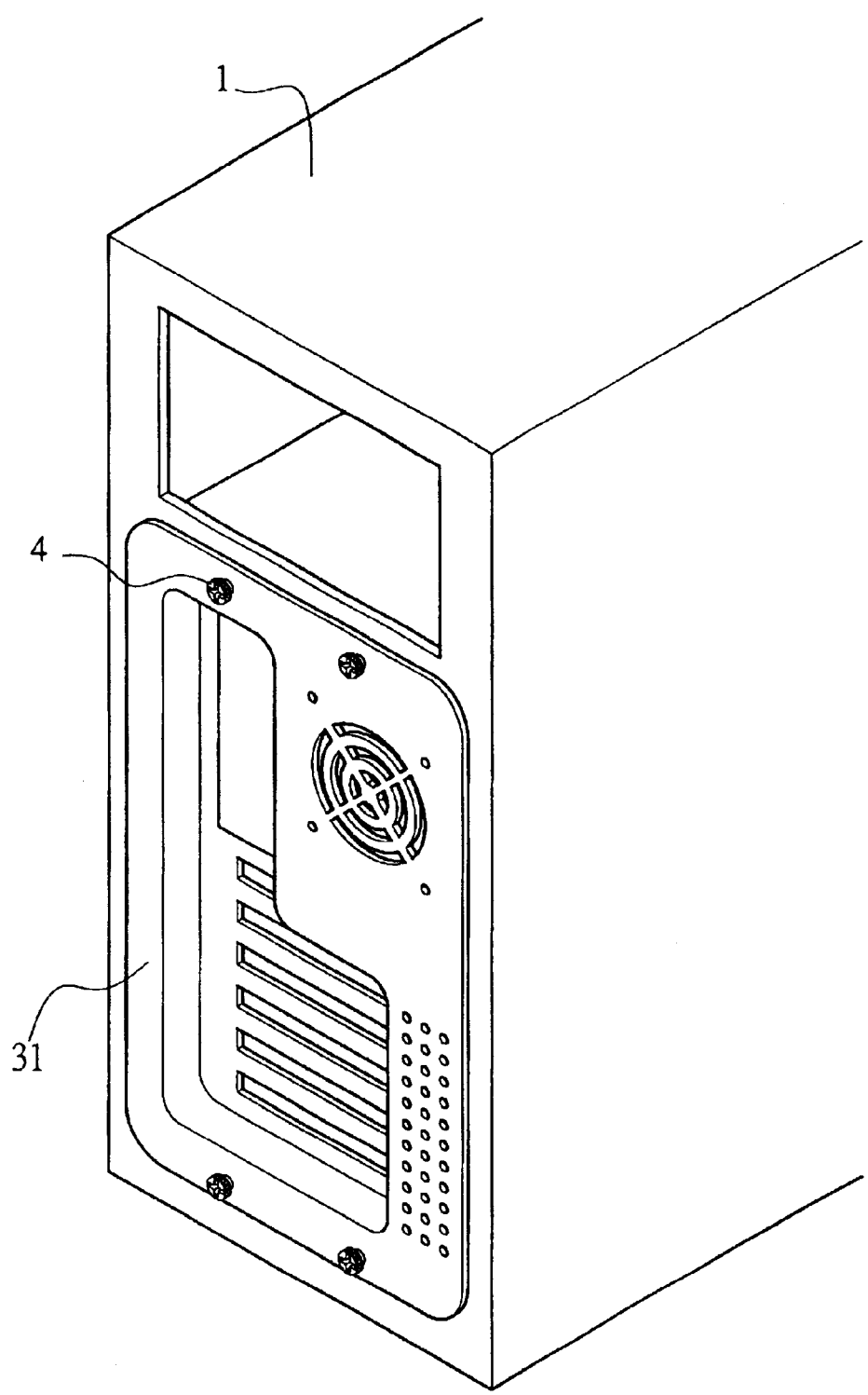
FIG. 1 is a pictorial drawing of the assembly of the present invention.
Figure 2:
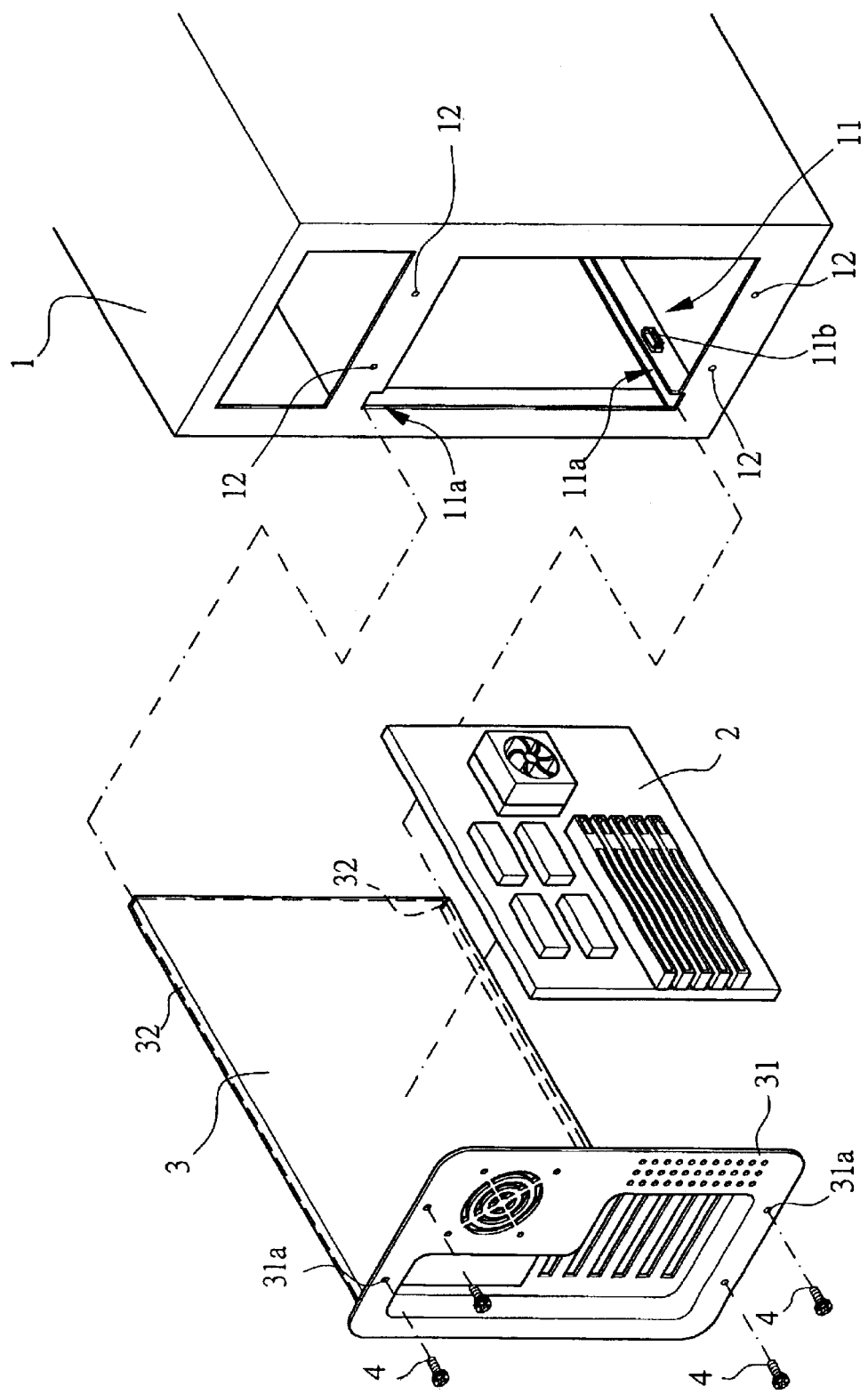
FIG. 2 is a pictorial and exploded drawing of the present invention.
Figure 3:
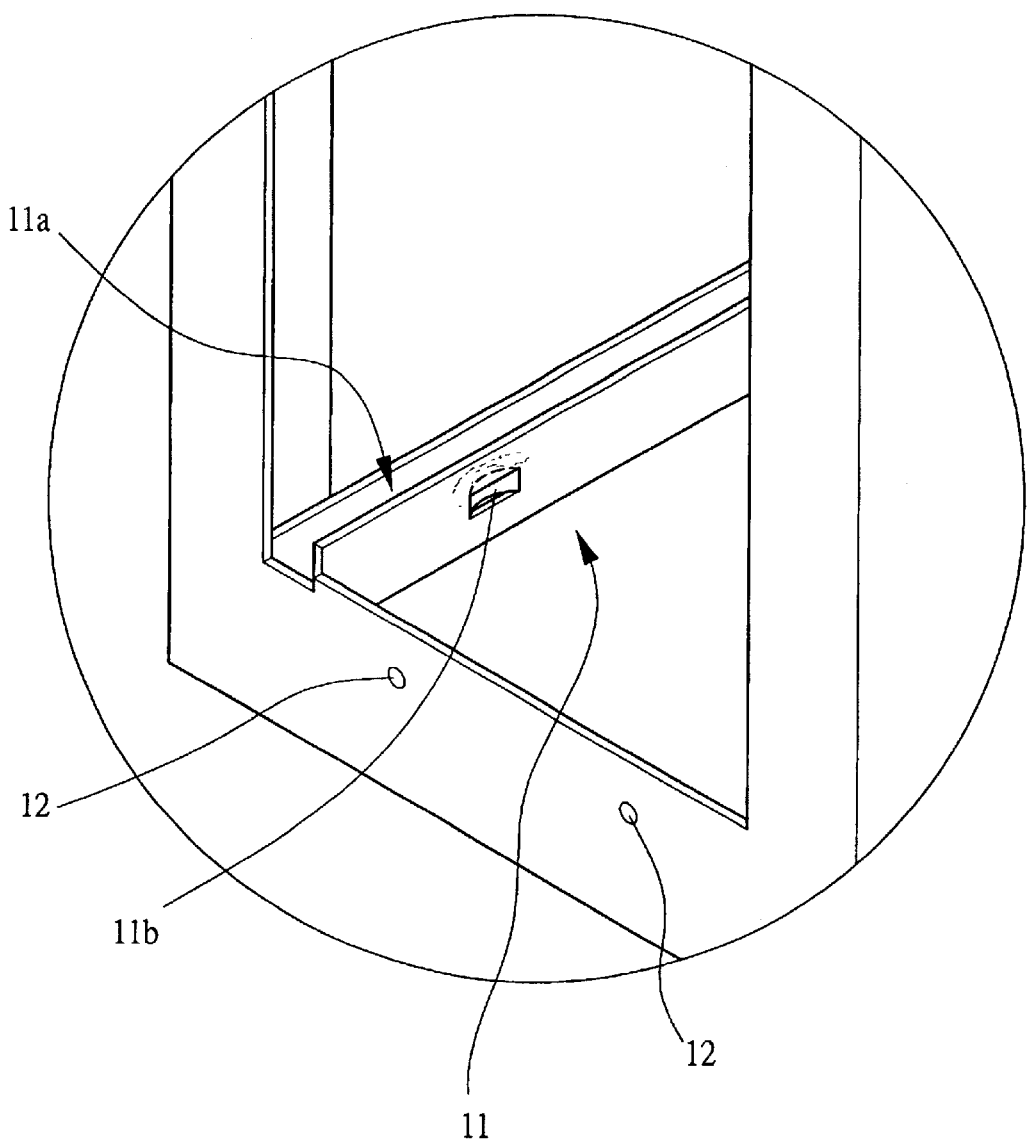
FIG. 3 is a partial enlargement drawing of a guide channel portion of a main unit frame shown in FIG. 2.

As indicated from FIGS. 1 to 3, the present invention comprising a motherboard seat plate (3) on the lateral side of a frame (1) for installing a computer motherboard (2) is characterized that a long opening (11) is disposed on the back side of the frame (1) and a guide channel (11a) is disposed respectively and oppositely on the upper and lower sides of the long opening (11); through punch processing or externally connecting independent parts, one or more than one resilient press plate (11b) is disposed inwardly on one side of the guide channel (11a) or on the inner or/and outer lateral end on one or two sides of the guide channel (11a); a plurality of screw holes (12) are disposed at the proper positions on the periphery of the back side of the frame (1). The motherboard seat plate (3) inserts into the guide channels (11a) via the guide rails (32) formed on the upper and lower rims thereof and via the long opening (11). The rear rim of the motherboard seat plate (3) is vertically and fixedly disposed with a back plate (31) for installing a connecting port and an interface card; after the motherboard seat plate (3) inserts into the long opening (11) on the back side of the frame (1), a big-end screw (4) penetrates a through hole (31a) on the back board to fasten onto a screw hole (12) on the frame (1) so as to finish the assembly.

According to the abovementioned structure, for inserting, replacing an interface card or maintaining the computer motherboard (2), since the computer motherboard (2) is fixed installed on the motherboard seat plate (3), all of the big-end screws (4) on the back plate (31) of the motherboard seat plate (3) are manually and simply unscrewed (no screw driver is needed because that the bigger screw ends are easy to hold manually for rotating to release or lock) to fast pull the motherboard seat plate (3) outwardly to protrude thereby allowing the direct insertion of the interface card or the maintenance of a computer motherboard (2) so as to eliminate the trouble of dismounting an outer case of a computer. In addition, when the motherboard seat plate (3) slides in the guide channel (11a) to reach a position location, the resilient press plate (11b) on the inner side of the guide channel (3) stably holds the motherboard seat plate (3) to prevent its swaying movement.

Furthermore, fastening the motherboard seat plate (3) by a plurality of big-end screws eliminates the trouble of using a screw driver to dismount thereby facilitating a computer user's application.

Figure 4:
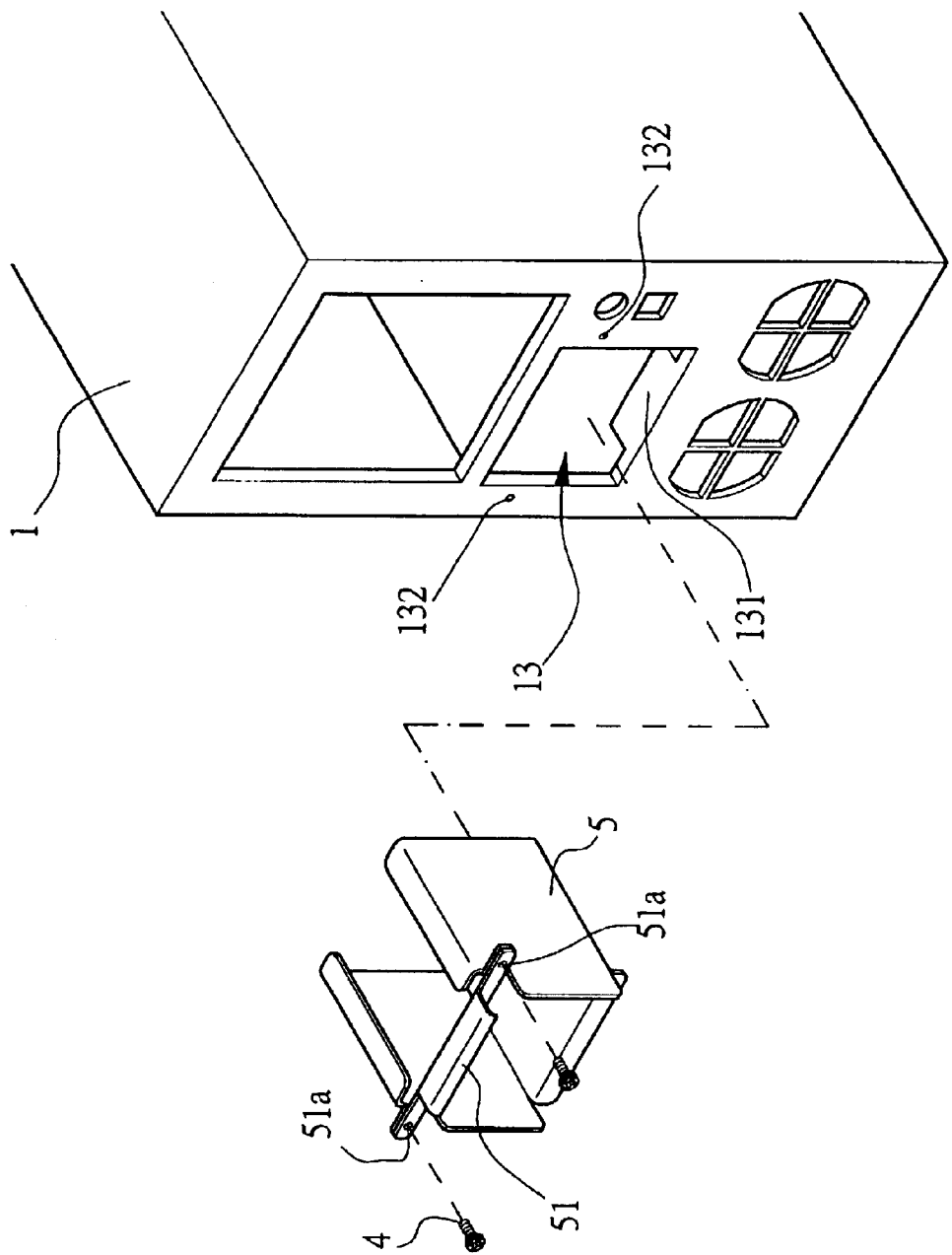
FIG. 4 is a pictorial and exploded drawing of another exemplary embodiment of the present invention.

Referring to FIG. 4, the front aspect of the frame (1) is disposed with a front opening (13) and a tongue tab (131) is disposed on the inner side at the lower aspect thereof; a screw hole (132) is respectively disposed on two sides of the front opening (13). A disk drive frame (5) is installed in the front opening (13); a transverse bar (51) is disposed at the front aspect of the disk drive frame (5); two ends of the transverse bar (51) are respectively disposed with a through hole (51a) to be penetrated by the big-end screw (4) to enter the screw hole (132) on two sides of the front opening (13) at the front aspect of the frame (1) thereby fastening the disk drive frame (5) at the front aspect of the frame (1).

To insert a 3.5-inch floppy disk drive or a hard disk into the disk drive frame (5), the big-end screw (4) situated at the front aspect of the disk drive (5) is unscrewed and the disk driver (5) is pulled outwardly to place the 3.5-inch floppy disk drive or the hard disk therein; since the disk drive (5) is capable of being pulled outwardly to protrude the two sides of the disk drive (5), it is possible to install fastening screws (4) on two sides of the 3.5-inch floppy disk drive or the hard disk for a stable installation on the disk drive (5) so as to achieve the efficiency of assembly and dismounting.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An extractable computer motherboard seat plate for installing a motherboard into a computer case, said seat plate located on a lateral side of a computer frame, a back side of the frame is provided with a long opening having a pair of guide channels oppositely located on an upper and a lower sides of the long opening to receive an upper and a lower motherboard seat plate rails respectively, said channels having at least one resilient press plate located inwardly on one side of the guide channel, wherein, when the motherboard seat plate enters the guide channels with its rear rim vertically coupled to a back plate for installing a connecting port and an interface card, said back plate is fastened onto the computer frame by at least one big-end screw inserted through a hole on the back plate.

2. The extractable computer motherboard seat plate for installing a motherboard into a computer case, according to claim 1, further comprising: a front opening provided at a front side of the computer frame said front opening having a tongue tab inwardly disposed on its lower end; a pair of screw holes respectively disposed on two sides of the front opening; a disk drive frame installed in the front opening, said disk drive frame having a transverse bar disposed at its front side, two ends of said transverse bar each provided with through holes to receive a pair of big-end screws respectively coupled with the screw holes on two sides of the front opening at the front side of the computer frame, thereby fastening the disk drive frame to the front side of the computer frame.

* * * * *